Aug. 16, 1955  I. E. WOOD  2,715,465
BEVERAGE BREWING CROCK
Filed April 21, 1952
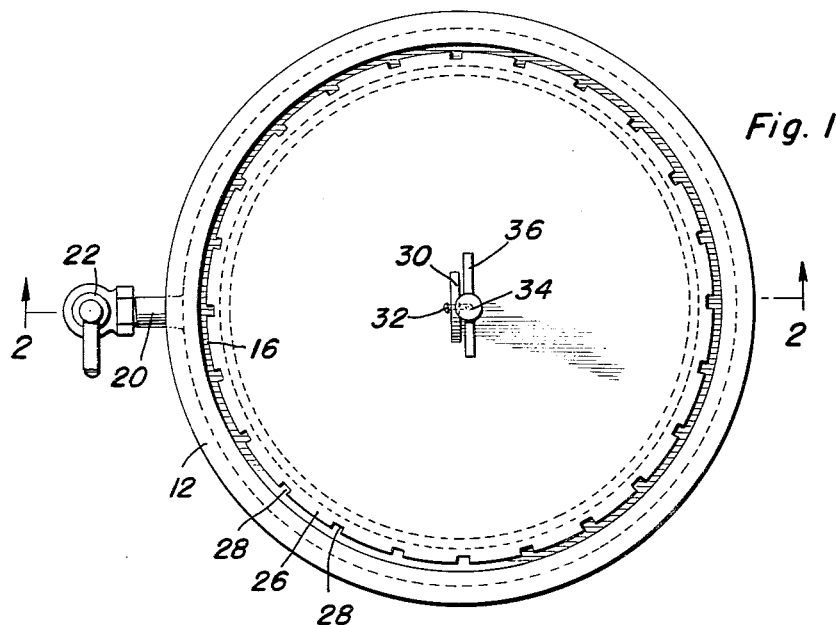
Fig. 1
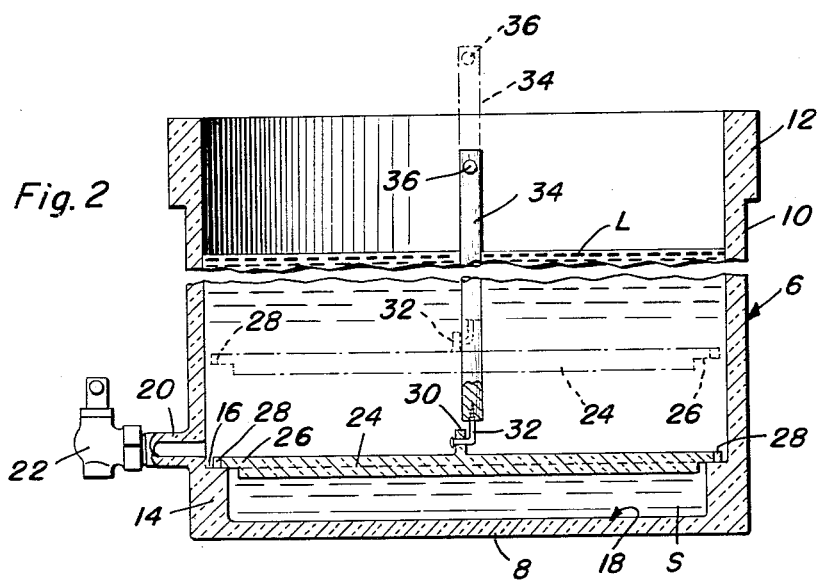
Fig. 2
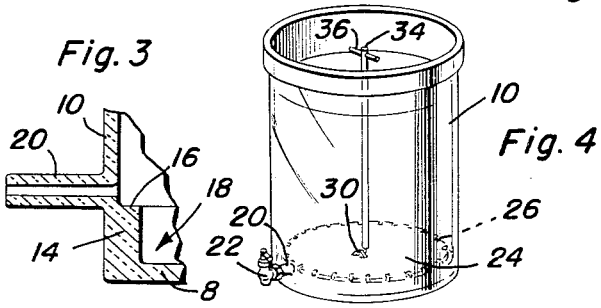
Fig. 3
Fig. 4
Ira E. Wood
INVENTOR.
BY *Clarence A. O'Brien*
*and Harvey B. Jackson*
Attorneys

United States Patent Office 2,715,465
Patented Aug. 16, 1955

2,715,465

BEVERAGE BREWING CROCK

Ira E. Wood, New Orleans, La.

Application April 21, 1952, Serial No. 283,300

2 Claims. (Cl. 210—57)

The present invention relates to certain new and useful improvements in earthenware, glass and equivalent non-corrosive crocks and has more particular reference to a crock which is especially, but not necessarily, practical for use in one's home in satisfactorily preparing beverages involving fermentation and attending sediment deposits, root beer, for example.

It is a matter of common knowledge that certain beverages brewed within the confines of a crock give off sedimentary deposits. The accumulating sediment usually descends to the bottom of the crock and after the brew has been sufficiently aged and is ready for bottling, it is difficult to remove the drinkable liquid completely free of suspended sediment. Therefore, the bottled liquid is often cloudy and distasteful and sometimes disagreeable to the extent that many persons have, evidently, abandoned the preparation in the home, of bottled beverages of one kind or another. The obvious object of the instant invention is to be able to separate the accumulated sediment from the usable liquid in order that the latter may be drawn off and bottled without portions of the disturbed or agitated sediment intermixed therewith.

One aspect of the invention has to do with a crock provided on the interior of its bottom with a sediment accumulating and trapping sump and which, in addition, is provided in one side, just above the top level of the sump with liquid dispensing means, for example, a withdrawing nipple and a valved spigot carried thereby.

More specifically, the invention appertains to a crock having an internal ledge which defines a sediment trapping sump, the sediment being isolated and maintained in the sump by way of a separator which rests on the ledge. The separator takes the form of an insertable and removable partitioning disk.

A further feature has to do with the stated construction wherein the separator has a hingedly attached handle whereby said separator may be lowered through the liquid in the crock and successfully seated on the ledge with requisite nicety and without too much disturbing the sediment in the sump.

Finally, novelty is predicated upon a handle-equipped circular separating disk for covering the sump which is of a prescribed diameter and is thus adapted to rest on the ledge and whose outer peripheral portion is provided with an outstanding marginal flange, said flange having circumferentially spaced notches and said notches serving during the lowering step to minimize resistance to the immersion of the disk in the liquid and to in this manner further prevent undue agitation and disturbance of the sediment which is pocketed in the sump.

Other objects, features and advantages will become more readily apparent from the following description and the accompanying sheet of drawings.

In the accompanying sheet of drawings wherein like numerals are employed to designate like parts throughout the views:

Figure 1 is a top plan view of a crock constructed in accordance with the principles of the present invention;

Figure 2 is a view partly in section and partly in elevation which may be said to be taken on the approximate line 2—2 of Figure 1, looking in the direction of the arrows;

Figure 3 is a fragmentary section on a still larger scale showing how the ledge is made and how the nipple is associated therewith;

Figure 4 is a perspective view on a small scale showing the complete crock with the separator in use.

Referring now to the drawings by reference numerals, the crock, as a unit, is denoted by the numeral 6. In practice it may be made from crockery, glass, tempered glass, wood, commercial plastics or whichever material is most practical looking toward economy and technique of manufacture and so on. Primarily, however, the material should be non-corrosive and transparent in character. The shape, size and capacity of the crock is conventional in character. The ordinary crock for home use will contain approximately nine gallons of liquid. The bottom 8 is flat and the body portion 10 is cylindrical and the upper portion is increased in thickness for stability as at 12. The lower interior bottom portion is also increased in cross-sectional thickness as at 14 to define an endless annular ledge 16 (Figure 3) which, in turn, defines a trap or sump 18 for the accumulating sediment. Incidentally, the sediment is indicated by the letter S in Figure 2 while the brewage or liquid is denoted by the letter L. The crock is further distinct in that at one side it is provided with a liquid withdrawing or crock emptying nipple 20. This, in turn, is either screw-threaded (Fig. 2) or, if preferred, plain (Fig. 3) to accommodate a suitable valved spigot 22.

The insertable and removable separator disk is likewise of non-corrosive and unbreakable material and may be of strong but light-weight commercial plastics. Both the crock and separator are preferably transparent. The separator has a thick body portion denoted by the numeral 24 and a reduced marginal edging flange 26 of an external diameter to properly rest on the ledge but to be spaced slightly from the interior diameter of the surrounding wall of the body of the crock. It will be clear, as best shown in Figure 2, that the relatively fixed body portion is such that it depends into the adjacent upper portion of the trap. The marginal flange is formed with circumferentially spaced notches or clearance apertures 28. These are obviously to diminish resistance to the descent of the separating disk through the liquid in order that it may be satisfactorily seated on the ledge without too much disturbing and agitating the sediment which has been trapped in the sump. The upper central portion of the separator is provided with an upstanding lug or ear 30 which accommodates a hook-like fastener 32 secured in the lower end of a wooden or equivalent dowel 34 which functions as a suitable lifting and lowering handle for the separator disk. The upper end of the dowel is provided with finger-grips 36.

The ingredients are put in the crock or vat in regular or stipulated fashion and the resultant mixture is allowed to remain for fermentation and brewing. Let it be assumed that the product being made is root-beer. Naturally, the relatively heavy sediment will settle to the bottom and accumulate and thus be trapped in the sump in an obvious manner. Now, when it is desired to withdraw or draw off the liquid for bottling the sump is covered and thus the sediment is isolated from the liquid. This is done by lowering the handle-equipped separator disk into the crock and gently permitting it to descend through the liquid until the notched flange rests upon the ledge. The notches, as before stated, provide lessened resistance to the actual descent of the separator disk.

Turbulence of the sediment in the sump is thus quelled to a minimum.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention as claimed.

Having described the invention, what is claimed as new is:

1. For use in a beverage brewing crock which has an internal ledge at its bottom defining a sediment accumulating trap; an insertable and removable transparent non-corrodible cover for said trap, said cover comprising a disk having an imperforate body portion which is adapted to be fitted into the trap and which has its outer marginal edge decreased in thickness and defining an integral outstanding flange, said flange being provided with circumferentially spaced pressure relieving and liquid clearance apertures, and an elongated handle hingedly connected at its lower end to the central upper side of said disk, said handle being of a length greater than the depth of the crock with which it is used in order that the stated disk may be lowered through a column of liquid and seated on the ledge, or lifted and removed from the crock with a minimum of disturbed turbulence of the contents of the crock.

2. A beverage brewing vessel comprising an open top non-corrodible crock, embodying a bottom and a wall attached to and rising from said bottom and thus defining a receptacle, said crock being provided on its interior at the juncture of the bottom and wall, with an endless ledge elevated above and encircling and cooperating with the bottom and defining a sediment trap, said wall being provided in one side at a position just above the level of the ledge with a liquid discharging nipple having a spigot attached thereto, and a non-corrodible separator disk removably seated on said ledge and thus covering the trap, said disk being of predetermined mass and therefore possessed of the requisite degree of heaviness required that it may descend through a column of liquid contained in said crock and to thus assume its required trap covering position on said ledge, said disk being of a diameter less than the inside diameter of said crock and outside diameter of said ledge, the body portion of the disk depending into the trap and the outer marginal portion of the disk being reduced in thickness to provide an endless outstanding flange, said flange resting on said ledge, the outer marginal edge of the flange being provided with circumferentially spaced notches opening through said outer edge and providing liquid passing apertures, and a lifting and lowering handle hingedly connected at its lower end to the central top portion of said disk, said handle being of a length greater than the depth of the crock so that it may be handily employed in lifting and lowering said disk.

References Cited in the file of this patent

UNITED STATES PATENTS

| | | |
|---|---|---|
| 295,330 | Barnum | Mar. 18, 1884 |
| 611,520 | Smith | Sept. 27, 1898 |
| 982,328 | Wheeler | Jan. 24, 1911 |
| 1,019,809 | Latham | Mar. 12, 1912 |
| 1,329,975 | Kines | Feb. 3, 1920 |
| 1,506,752 | Hill | Sept. 2, 1924 |
| 1,694,471 | Jacobi | Dec. 11, 1928 |
| 1,776,498 | Freeland | Sept. 23, 1930 |
| 1,820,790 | Feezer | Aug. 25, 1931 |
| 1,995,072 | Mills | Mar. 19, 1935 |
| 2,533,806 | Holzappel | Dec. 12, 1950 |